United States Patent [19]

Croitoru et al.

[11] Patent Number: 5,605,716
[45] Date of Patent: Feb. 25, 1997

[54] METHOD OF MAKING HOLLOW WAVEGUIDES

[75] Inventors: Nathan Croitoru, Kfar Saba; Jacob Dror, Tel Aviv; Alexandra Inberg, Herzliya, all of Israel

[73] Assignee: Ramot University Authority for Applied Research & Development, Tel Aviv, Israel

[21] Appl. No.: 566,693

[22] Filed: Dec. 4, 1995

[30] Foreign Application Priority Data

Dec. 6, 1994 [IL] Israel ......................................... 111904

[51] Int. Cl.⁶ ....................................................... B65D 5/06
[52] U.S. Cl. ...................... 427/163.2; 427/171; 427/172; 427/230; 427/299; 427/306; 427/337; 427/404
[58] Field of Search ................................. 427/163.2, 337, 427/299, 404, 230, 172, 171, 306

[56] References Cited

U.S. PATENT DOCUMENTS

| 4,009,382 | 2/1977 | Nath ........................................ 240/1 LP |
| 4,453,803 | 6/1984 | Hidaka et al. ......................... 350/96.32 |
| 4,652,083 | 3/1987 | Laakmann ............................. 350/96.32 |
| 4,930,863 | 6/1990 | Croitoru et al. ...................... 350/96.32 |

*Primary Examiner*—Janyce Bell
*Attorney, Agent, or Firm*—Benjamin J. Barish

[57] ABSTRACT

A method of making a hollow waveguide for transmitting electromagnetic radiation includes: filling voids on the inner surface of an insulator tube with a coating of a void-filling, hydrophylic material having a free pair of electrons and capable of complexing metal ions; applying a solution of a metal salt over the void-filling material to form a metal complex with the void-filling material; reducing the metal complex to a pure metal layer; and depositing a dielectric film on the pure metal layer.

20 Claims, 2 Drawing Sheets

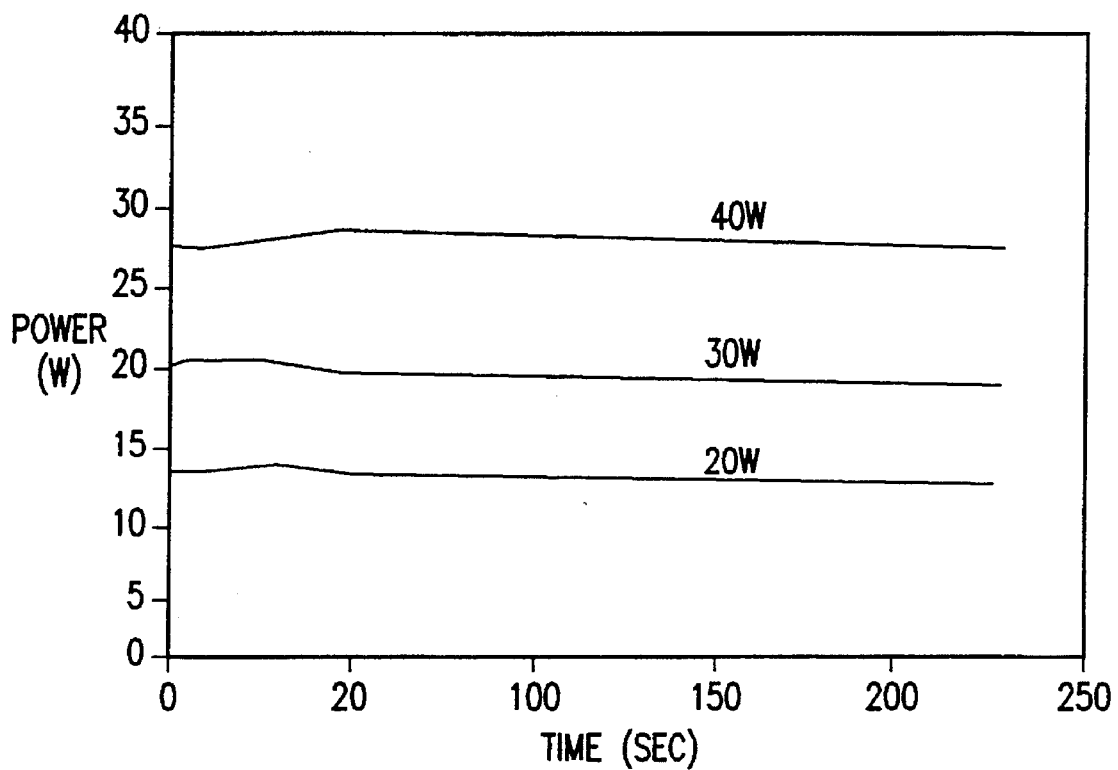
FIG. 3 (NEW METHOD)

METHOD OF MAKING HOLLOW WAVEGUIDES

FIELD AND BACKGROUND OF THE INVENTION

The present invention relates to a method of making a hollow waveguide for transmitting electromagnetic radiation, such as ultraviolet (UV), visible (VIS), or infrared (IR) radiation.

Flexible waveguides (WG) are used to transmit electromagnetic radiation (UV, VIS or IR) from a source to a target in straight or curved trajectories. However, the transmission of the electromagnetic energy is reduced by the roughness of the waveguide inner walls. Such roughness increases losses by scattering and by absorption of the radiation. The scattering centers are of two types: (1) Ripples and defects in the plastic tube; and (2) microcrystals, voids, cracks and grains in the deposited metallic and dielectric layers.

In order to achieve minimum losses, high transmitted power, and high flexibility (e.g., bending radii of less than 15 cm) simultaneously, the waveguide may be prepared of three concentric components: (1) a relatively thick insulator tube (e.g., plastic, glass or quartz); (2) a metal layer on the inner surface of the insulator tube; and (3) a dielectric film over the metal layer. Component (1) forms a flexible base, while components (2) and (3) form the energy guiding materials. Our U.S. Pat. No. 4,930,863 discloses a hollow waveguide of this type, and its disclosure is incorporated herein by reference.

This type of waveguide can be made by: (a) depositing a metallic layer and then a dielectric overlayer on the inner wall of a metal, ceramic, plastic, glass (diameter less than 0.8 mm) or quartz tube; or (b) depositing the dielectric layer on the inner surface of a metal tube, and a plastic layer on the outer surface of the metal tube. Method (a) enables one to produce a waveguide having relatively high flexibility but suitable for relatively low power transmission; whereas method (b) enables one to produce a waveguide suitable for higher power transmission, but having lower flexibility.

The plastic, glass or metallic tube, and the metallic/dielectric layers, must all be very smooth. Such smoothness can be achieved either prior to the deposition of each layer, during the deposition, or after the deposition, by smoothing methods as described below. For instance, the base tube, made of plastic, may have ripples or defects in the internal surface, and therefore requires a suitable smoothing treatment to reduce its roughness before metal deposition. The roughness accumulates with every deposited layer since each layer replicates the roughness of its underlying layer(s) and adds its own roughness. Such roughness scatters the radiation and reduces transmission.

OBJECTS AND BRIEF SUMMARY OF THE INVENTION

An object of the present invention is to provide a method of making a hollow waveguide of this type minimizing roughness and scattering of the radiation.

According to the present invention, there is provided a method of making a hollow waveguide for transmitting electromagnetic radiation, comprising: preparing an insulator tube; filling voids on the inner surface of the insulator tube with a coating of a void-filling, hydrophylic material having a free pair of electrons and capable of complexing metal ions; applying a solution of a metal salt over the coating of void-filling material to form a metal complex with the void-filling material; reducing the metal complex to a pure metal layer; and depositing a dielectric film on the pure metal layer.

According to the preferred embodiments of the invention described below, the void-filling hydrophylic material is a polymer selected from the group of polymerized aliphatic amines and aromatic amines.

In one described embodiment, the void-filling hydrophylic material is polyaniline, and is applied by mixing (a) a solution of $(NH_4)_2S_2O_8$ in HCl and (b) a solution of aniline in HCl; and applying the mixture to the inner face of the insulator tube. In a second described embodiment, the void-filling hydrophylic material is an amino (includes diamino and polyamino) silane and is applied from a solution of the silane, such as aminoethyl-amino-N-proplytrimethoxy silane.

According to further features in the described preferred embodiments, after the void-filling hydrophylic material is applied, a thin, adherent, continuous film of paladium is applied to further smoothen the inner surface of the insulator tube and to serve as a catalyzing layer for the metal layer subsequently produced by applying the solution of the metal salt and reducing the metal complex formed therefrom to the pure metal layer. Preferably, the metal salt applied to the thin, adherent paladium film is a silver salt which is subsequently reduced to silver.

According to further features in the described preferred embodiments, the dielectric film is deposited on the metal layer by treating the metal layer with a halogen to form a metal halide film. Preferably, the metal layer is silver, and the formed metal halide is silver iodide.

In one described preferred embodiment, the insulator tube is of plastic and is subjected to a pull force of at least one kilogram for at least one hour, preferably with simultaneous or separate heating to a temperature of at least 100° C., to smoothen its surfaces before the coating of the void-filling hydrophylic material is applied. In a second described embodiment, the insulator tube is glass or quartz and is cleaned with hot concentrated $HNO_3$ before the coating of the void-filling hydrophylic material is applied.

As will be described below, hollow waveguides constructed in accordance with the foregoing methods are characterized by substantially smoother surfaces than in previous methods, thereby substantially increasing the transmission percentage and reducing losses.

Further features and advantages of the invention will be apparent from the description below.

BRIEF DESCRIPTION OF THE DRAWINGS

The invention is herein described, by way of example only, with reference to the examples described below and the accompanying drawings, in which.

FIG. 3 is a diagram illustrating the power output of a waveguide after treatment in accordance with the present invention.

DESCRIPTION OF PREFERRED EMBODIMENTS

Figure 1:
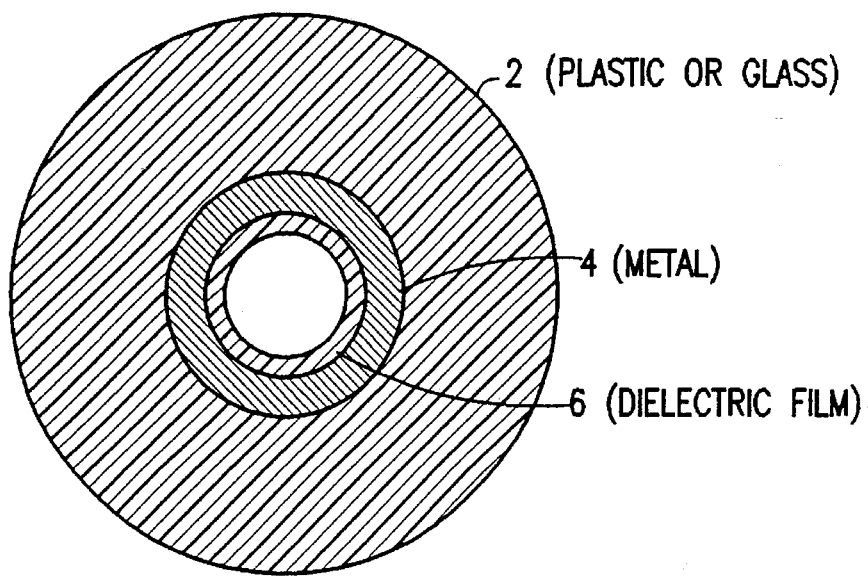
FIG. 1 illustrates one form of hollow waveguide constructed in accordance with the present invention.

The hollow waveguide illustrated in FIG. 1 is of the construction described in the above-referenced U.S. Pat. No.

4,930,863. Briefly, it includes an insulator tube 2, a metal layer 4 on its inner surface, and a dieletric film 6 over the metal layer. The insulator tube 2 may be a ceramic, glass, quartz, or plastic material such as a fluoropolymer (e.g., "Teflon"), polyethylene, polypropylene, a polyamide (e.g., nylon), polyimide, natural or synthetic rubber, polyvinylchloride, or any of the other materials mentioned in the above-cited patent. The metal layer 4 is preferably of silver, and the dielectric film 6 is preferably a metal halide film, such as silver iodide or silver bromide. More particulars as to the construction of such a hollow waveguide are set forth in the above-cited patent.

Following is a description of a series of treatments to create a smooth surface on the waveguide as well as to prepare it for a modified metal(s) deposition while retaining the mechanical characteristics of the desired material.

If a plastic tube is used as the insulator tube 2 of the waveguide, the first stage is a combination of pulling and heating, either separately or simultaneously, to smoothen the surface of the insulator tube. If the insulator tube is of glass or quartz, the tube is cleaned with hot concentrated $HNO_3$.

The second stage is to fill all the small voids, cracks and scratches in the tube to further smoothen its surfaces. In the examples described below, this is done in an additive manner by filling the voids in the inner surface of the insulator tube with a coating of a void-filling, hydrophylic material having a free pair of electrons and capable of complexing metal ions. Preferably, the void-filling hydrophylic material is a polymer selected from the group of polymerized aliphatic amines and aromatic amines. Examples described below include polyaniline and amino silanes.

The third stage is to activate the surface towards the electroless metal plating by depositing a paladium (Pd) layer or very small Pd particles. In the examples described below, the Pd is applied, not as a deposit of small Pd particles, but rather as a thin, adherent, continuous film; this further smoothens the inner surface of the insulator tube, and also serves as a catalyzing layer for the metal layer subsequently produced by electroless plating.

The fourth stage is to deposit a base metal over the active surface. This metal can be the same as the original waveguide metallic layer (e.g., Ag), or can be a different metal (e.g., Ni, Co or Cu); also, it can be in the form of a single layer, or include several metal sublayers. The metal sublayers may also serve as a heat sink to dissipate the heat which accumulates in the waveguide during IR laser energy transmission.

The fifth stage is to etch the deposited Ag layer by Ag and $Ag_2O$ dissolving agents such as $HNO_3$ or $Na_2S_2O_3$ solutions to further smoothen and homogenize the surfaces.

The sixth stage is to treat the metal layer with a halogen to form a metal halide film. Preferably, the metal layer is silver, and the metal halide film is silver iodide.

Even afer all the precautions are taken during the above process, there may still be segments in the waveguide where roughness can be detected, e.g., by employing a thermal image camera. Roughness creates hot points which propagate along a wall; as a result, a section of the wall may be heated during the IR energy transmission. Such rough regions tend to be concentrated near the proximal or distal ends of the waveguide and should be removed by severing these sections.

Following are two examples of preparing a hollow waveguide in accordance with the present invention: The first example utilizes an insulator tube of a plastic material; and the second example utilizes an insulator tube of glass or quartz:

EXAMPLE 1

This example involves the preparation of a waveguide from a plastic tube suitable for Er-YAG laser energy ($\lambda=2.94$ μm) transmission.

1. A "Teflon" (Reg. TM) tube (internal diameter 1.9 mm, wall thickness 0.3–0.5 mm) is cut to the desired length and pulled with a weight of 2.5 kg for a few hours (preferably overnight). The pulling can be horizontal or vertical and is preferably performed in an oven at a temperature of 100°–150° C.

2. In case the pulling was at room temperature, the heating is applied later by heating to 150° C. for two hours.

3. The tube is etched in 1 mole/dm$^3$ Na-Naphthalene solution in tetrahydrofurane (THF) washed successively with THF, acetone and dionized water (DIW) and then re-etched for a short period (up to 30 sec at most) with sulfochromic acid followed by washing with dilute HCl and DIW.

4. The voids and defects of the internal surface of the tube are filled with a polymer (polyaniline) simultaneously prepared and deposited as follows:
  (a) Solution A: 1.5 gr of $(NH_4)_2S_2O_8$ in 200 ml of 1 mole/dm$^3$; HCl;
  (b) Solution B: 20 ml of aniline +300 ml of HCl 1 mole/dm$^3$.

The solutions must be fresh, preferably prepared just before mixing; long time storage of the solutions will reduce their effectiveness. The solutions are mixed in the order of 20 ml A+30 ml B and the mixed product is brought at once into contact, at room temperature, with the inner surface of the tube. A dark blue-green color is gradually developed in the solution and on the surface. The contact is terminated after 10–20 minutes (ca. five minutes after the first appearance of the color), and the surface is rinsed with de-ionized water (DIW). The colored film adhered to the wall is polyaniline.

5. Prior to metal deposition, a catalyzing layer is deposited. The most effective metal for this task is Pd. The literature includes many recipes to prepare microcrystals of Pd and one can also buy commercial "Pd colloide" solutions. However, the present method deposits a thin continuous, adherent Pd film on the surface which contributes to its smoothness. 100 ml of citrate buffer is made by the combination of two solutions:

A. 0.1 mole/dm$^3$ of disodium citrate or a combintion of 21 gr of citric acid monohydrate +200 ml of 1 mole/dm$^3$ NaOH; and B. HCl 0.1 mole/dm$^3$ A solution made of 37 ml of A+63 ml of B has a final pH in the range of 2.5–3. (The citrate buffer is only an example for a pH 2.5–3 buffering solutions. Other combinations such as glycine buffer or KH phtalate are also possible.) To this solution we add $PdCl_2$ so that $Pd^{+2}$ contration is $3·10^{-5}$ mole/dm$^3$. To 30 ml of this solution 1 mole/dm$^3$ hydrazine hydrate solution is added dropwise at room temperature. The solution-is brought into contact with the substrate surface for 2–30 minutes, rinsed thoroughly with DIW, and taken to further metal plating. A Ni base layer is deposited as set forth below:

6. The base metal is deposited from a bath containing: $NiCl_2·6H_2O$-30 gr/liter, $NaH_2PO_2$-10 gr/liter, tri Na citrate dihydrate 10 gr/l. The pH of the bath is 4–6 (if higher or lower values were reached appropriate amounts of HCl or NaOH solution can be added to achieve the desired pH range). The waveguide is immersed in the Ni solution for 10–15 minutes at temperature of 75° C. (which is lower than the usual Ni plating 90°–95° C.). It is recommended to add brighteners and leveling agents such as sodium saccharine (1% W/V), sodium dodecyl sulfate (1% W/V), 1-phenyl 3-pyrazolidinon (1% W/V) 2-butyne 1,4 diol, chloramine B or T or tetracycline (antibiotics).

7. Stage 6 can be repeated at this point, but in many cases this is not essential and the Ag layer (described below at stage 9) will be deposited and adhered to the Ni without any further treatment.

8. The Ag reflecting layer is deposited in a similar manner as described in U.S. Pat. No. 4,930,863. Sodium saccharine and other additives described in Stage 7 are recommended here too. It must be noted that several layers of Ag deposited as described in this stage can be substituted for the Ni layer described in Stages 6–7. The tube having the Ag film is dried by admitting a stream of $N_2$ for 20 minutes.

9. The Ag layer, prepared in the previous stage, may not be smooth enough, especially when small wavelength energy has to be transmitted through the waveguide. A recommended method of improving smoothness of the Ag layer is to etch it with $HNO_3$ (ca. 1% V/V), $Na_2S_2O_3$ (0.1–2% W/V) or KSCN (1% W/V) solutions in water or water ethanol (1:1 V/V) these processes remove the oxide layer of the Ag, etch it and smoothen it. Since this process involves a removal of the upper Ag layer a short contact time (0.5–2 minutes) is recommended.

10. The dielectric layer is prepared from an iodination solution 0.5–20% (W/V)$I_2$ in ethanol. Contact times with the $N_2$ dried Ag layer is, for $CO_2$ laser energy transmission, 2.5 minutes of 12.5% (W/V)$I_2$ solution; for waveguides suitable for transmission of wavelengths of the visible spectrum and near infrared up to 5 µm,–1–5% (W/V)$I_2$, the contact time is 1–1.5 minutes. A bromine ($Br_2$) solution in the same conditions can serve as a substitute for the iodine solution and gives practically the same results. The tube is then dried by a stream of $N_2$ for 20 minutes.

11. The waveguide is analyzed for rough regions and defects by taking IR images during the energy transmission employing a thermal camera. The detected rough regions in which the density of such hot points is large are removed, e.g., by severing. Experiments performed for detecting the hot spots have shown that the most susceptible areas are the ends of the waveguide, especially the distal end.

Figure 2:
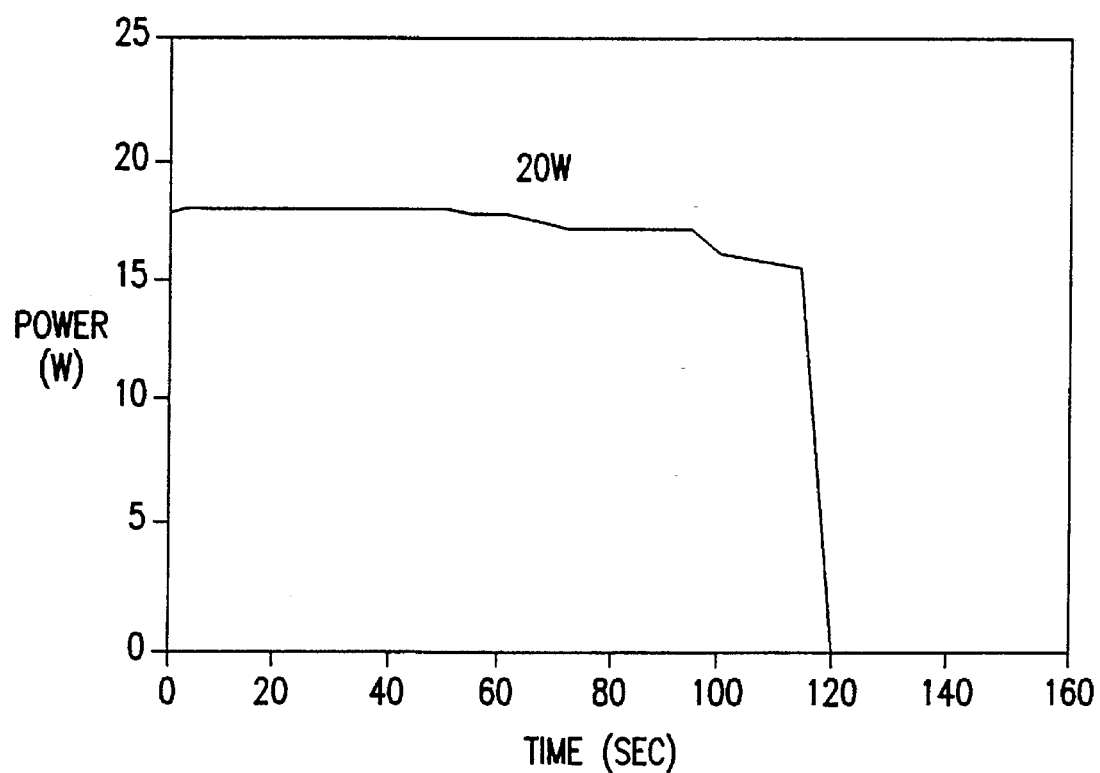
FIG. 2 is a diagram illustrating the power output of a waveguide before treatment in accordance with the present invention.

FIG. 2 illustrates the power transmission characteristics of a plastic waveguide when constructed in accordance with the prior method disclosed in U.S. Pat. No. 4,930,863 for the transmission of $CO_2$ laser energy ($\lambda$=10.6 µm); whereas FIG. 3 illustrates the power transmission characteristics when such a waveguide is constructed in accordance with the method as set forth above. As can be seen from FIG. 3, the novel method permits a waveguide, e.g., of a length of one meter, to transmit 77–95% of the energy. It will thus be seen that the above-described method can be used to prepare waveguides suitable for $CO_2$ laser energy ($\lambda$=10.6 µm) to produce transmission yields of greater than 90%.

EXAMPLE 2

This example involves the preparation of waveguide from a glass or quartz tube suitable for IR energy transmission.

1. The glass or quartz tube is carefully washed (inside) with hot DIW, detergent solution, hot DIW and hot concentrated $HNO_3$ successively. This process is repeated three times.

2. The void filling process is performed according to one of the following methods:

(a) 20 ml of A+30 ml of B (as in Example 1 stage 4) are mixed and brought into contact at room temperature with the glass or quartz surface for ten minutes. A colored layer of polyaniline is developed on the surface. Solutions A and B must be freshly prepared; or (b) 0.5–5% solution of amninoethyl-amino-N-proplyltri-methoxy silane [$N_2N-CH_2-CH_2-NH-CH_2-CH_2-CH_2-Si-(OCH_3)_3$], or aminoproply tri-methoxysilane [$H_2N-(CH_2)_3-Si(OCH_3)_3$], in enthanol or DIW is brought into contact with the glass surface (1–30 minutes, 20°–70°). The glass is later washed with ethanol and DIW.

3. It is possible to plate Ag directly on the amino-silanized surface, but since the reaction is slow and the layer tends to be inhomogeneous, it is recommended to perform stage 5, Example 1 on the surface.

4. The silver plating and halogenation (iodination) follows stages 8 and 10 in Example 1. Ag smoothing is not necessary here since the glass surface is much smoother than any plastic.

The following Tables 1 and 2 compare the transmission results achieved by waveguides made by the previous method (that is, following Israel Patent 86296, U.S. No. Pat. 4,930,863), and by the method of the present invention as set forth in the Examples 1 and 2, respectively:

TABLE 1

| Waveguide | ID | Length | Transmission (%) | Attenuation dB/m |
|---|---|---|---|---|
| $CO_2$ laser engery transmission ($\lambda$ = 10.6 µm) | | | | |
| Previous | 3.2 mm | 0.7 m | 80% | 1.4 |
| Example 1 | 1.05 mm | 1.2 m | 90% | 0.4 |
| Er-YAG laser energy transmission ($\lambda$ = 2.94 µm) | | | | |
| Previous | 1.9 mm | 0.5 m | 40% | 10 |
| Example 1 | 1.9 mm | 1 m | 90% | 0.46 |

The maximum input power for waveguides made according to the previous method for transmitting power of $CO_2$ laser energy was about 20 watts; it was found that this input power could be increased to about 80 watts when the waveguide was made in accordance with the method of Example 1 above.

The following Table 2 shows the results produced when making a glass waveguide according to Example 2 above:

TABLE 2

| Waveguide | ID | Length | Transmission (%) | Attenuation dB/m |
|---|---|---|---|---|
| $CO_2$ laser engery transmission | | | | |
| Example 2 | 0.7 mm | 1.2 m | 70% | 1.3 |
| Er-YAG laser energy transmission | | | | |
| | 0.7 mm | 0.5 m | 90% | 1.3 |

While the invention has been described with respect to several preferred embodiments, it will be appreciated that these are set forth merely for purposes of example, and that many other variations, modifications and applications of the invention may be made.

We claim:

1. A method of making a hollow waveguide for transmitting electromagnetic radiation, comprising:

preparing an insulator tube;

filling voids on the inner surface of the insulator tube with a coating of a void-filling, hydrophylic material having a free pair of electrons and capable of complexing metal ions;

applying a solution of a metal salt over said coating of void-filling material to form a metal complex with said void-filling material;

reducing said metal complex to a pure metal layer;

and depositing a dielectric film on said pure metal layer.

2. The method according to claim 1, wherein said void-filling, hydrophylic material is a polymer selected from the group of polymerized aliphatic amines and aromatic amines.

3. The method according to claim 1, wherein said void-filling hydrophylic material is polyaniline.

4. The method according to claim 3, wherein said polyaniline is applied by mixing (a) a solution of $(NH_4)_2S_2O_8$ in HCl and (b) a solution of aniline in HCl; and applying the mixture to the inner face of the insulator tube.

5. The method according to claim 1, wherein said void-filling hydrophylic material is an amino silane.

6. The method according to claim 5, wherein said amino silane is applied from a solution of aminoethyl-amino-N-proplytrimethoxy silane, or amino-N-propyl trimethyl silane.

7. The method according to claim 1, wherein after the void-filling hydrophylic material is applied, a thin, adherent, continuous film of paladium is applied to further smoothen the inner surface of the insulator tube and to serve as a catalyzing layer for the metal layer subsequently produced by applying the solution of the metal salt and reducing the metal complex formed therefrom to the pure metal layer.

8. The method according to claim 7, wherein the metal salt applied to the thin, adherent paladium film is a silver salt which is subsequently reduced to silver.

9. The method according to claim 1, wherein the dielectric film is deposited on said metal layer by treating the metal layer with a halogen to form a metal halide film.

10. The method according to claim 9, wherein said metal layer is silver, and said formed metal halide film is silver iodide.

11. The method according to claim 1, wherein said insulator tube is of plastic, and is subjected to a pull force of at least one kilogram for at least one hour to smoothen its surfaces before said coating of a void-filling hydrophylic material is applied.

12. The method according to claim 11, wherein said insulator tube is also heated to a temperature of at least 100° C.

13. The method according to claim 1, wherein said insulator tube is of glass or quartz and is cleaned with hot concentrated $HNO_3$ before the coating of said void-filling hydrophylic material is applied.

14. A method of making a hollow waveguide for transmitting electromagnetic radiation, comprising:

preparing an insulator tube;

filling voids on the inner surface of the insulator tube with a coating of a void-filling, hydrophylic material having a free pair of electrons and capable of complexing metal ions;

applying a solution of a silver salt over said coating of void-filling material to form a silver complex with said void-filling material;

reducing said silver complex to a silver layer;

and treating said silver layer with a halogen to form a silver halide dielectric film on said silver layer.

15. The method according to claim 14, wherein said void-filling, hydrophylic material is a polymer selected from the group of polymerized aliphatic amines and aromatic amines.

16. The method according to claim 14, wherein said void-filling hydrophylic material is polyaniline.

17. The method according to claim 16, wherein said polyaniline is applied by mixing (a) a solution of $(NH_4)_2S_2O_8$ in HCl and (b) a solution of aniline in HCl; and applying the mixture to the inner face of the insulator tube.

18. The method according to claim 14, wherein said void-filling hydrophylic material is an amino silane.

19. The method according to claim 18, wherein said amino silane is applied from a solution of aminoethyl-amino-N-proplytrimethoxy silane, or amino-N-propyl trimethyl silane.

20. The method according to claim 14, wherein after the void-filling hydrophylic material is applied, a thin, adherent, continuous film of paladium is applied to further smoothen the inner surface of the insulator tube and to serve as a catalyzing layer for the silver layer subsequently produced by applying the solution of the silver salt and reducing the silver complex formed therefrom to the silver layer.

* * * * *

UNITED STATES PATENT AND TRADEMARK OFFICE
CERTIFICATE OF CORRECTION

PATENT NO. : 5,605,716
DATED : February 25, 1997
INVENTOR(S) : Croitoru et al

It is certified that error appears in the above-indentified patent and that said Letters Patent is hereby corrected as shown below:

Column 1, line 32, "depositling" should be --depositing--

Column 1, line 59, "making-a" should be --making a--

Column 2, line 16, "tion-of" should be --tion of--

Column 2, line 16, "proplytri-" should be --propyltri---

Column 4, line 20, "dionized" should be --deionized--

Column 4, line 28, delete ";"

Column 4, line 39, "de-ionized" should be --deionized--

Column 4, line 48, "combin-" should be --combina---

Column 4, line 50, "combintion" should be --combination--

Column 4, line 53, before "A", insert --.--

Column 4, line 58, "contration" should be --concentration--

Column 4, line 61, "solution-is" should be --solution is--

Column 5, line 8, after "W/V)", insert --,--

UNITED STATES PATENT AND TRADEMARK OFFICE
CERTIFICATE OF CORRECTION

Page 2 of 2

PATENT NO. : 5,605,716
DATED : February 25, 1997
INVENTOR(S) : Croitoru et al

It is certified that error appears in the above-indentified patent and that said Letters Patent is hereby corrected as shown below:

Column 6, line 12, "$N_2N$" should be --$H_2N$--

Signed and Sealed this

Seventh Day of October, 1997

*Attest:*

BRUCE LEHMAN

*Attesting Officer*  *Commissioner of Patents and Trademarks*